United States Patent [19]
Clapp

[11] 3,985,425
[45] Oct. 12, 1976

[54] POLARIZING BEAM SPLITTING UNIT
[76] Inventor: Roy A. Clapp, 10522 Foley Blvd., Coon Rapids, Minn. 55433
[22] Filed: Aug. 18, 1975
[21] Appl. No.: 605,267

[52] U.S. Cl. ............................. 350/147; 350/155; 350/171
[51] Int. Cl.² .................... G02B 5/30; G02B 27/14
[58] Field of Search ........... 350/147, 152, 155, 165, 350/171, 173; 353/37; 355/71

[56] References Cited
UNITED STATES PATENTS
| | | |
|---|---|---|
| 2,403,731 | 7/1946 | MacNeille .......................... 350/171 |
| 2,601,806 | 7/1952 | Turner ................................ 350/165 |
| 2,641,954 | 6/1953 | Scharf et al ....................... 350/165 |

FOREIGN PATENTS OR APPLICATIONS
| | | | |
|---|---|---|---|
| 1,126,392 | 9/1968 | United Kingdom ................ | 350/152 |

Primary Examiner—Ronald J. Stern
Assistant Examiner—Wm. H. Punter
Attorney, Agent, or Firm—Stuart R. Peterson

[57] ABSTRACT

The polarizing beam splitting unit comprises a filter in the form of a layer of polarizing material which passes light in only one plane. This polarizing layer or filter is sandwiched between two transparent glass substrates, one substrate having a reflection-enhancing coating and the other substrate having an anti-reflection coating. In one embodiment the reflection-enhancing coating consists of a single layer of cerium oxide, and in a second embodiment the coating consists of layers of zinc sulphide, magnesium fluoride and silicon dioxide. In both situations the anti-reflection coating consists of magnesium fluoride. The polarizing beam splitting unit is employed in a composite photography system.

7 Claims, 4 Drawing Figures

U.S. Patent   Oct. 12, 1976   3,985,425
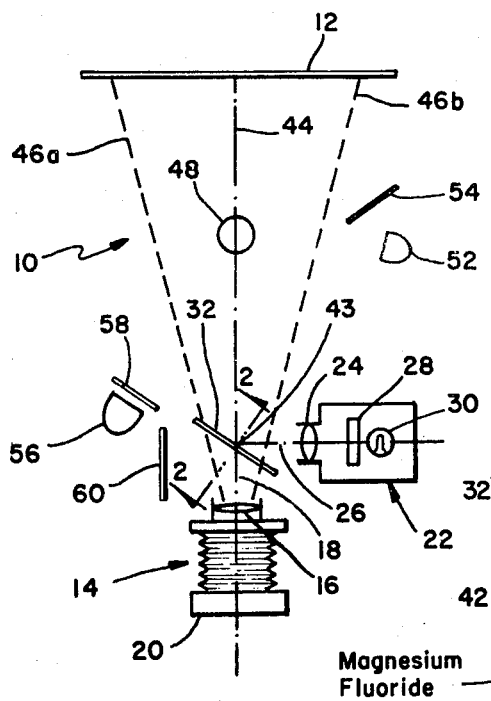
Fig 1
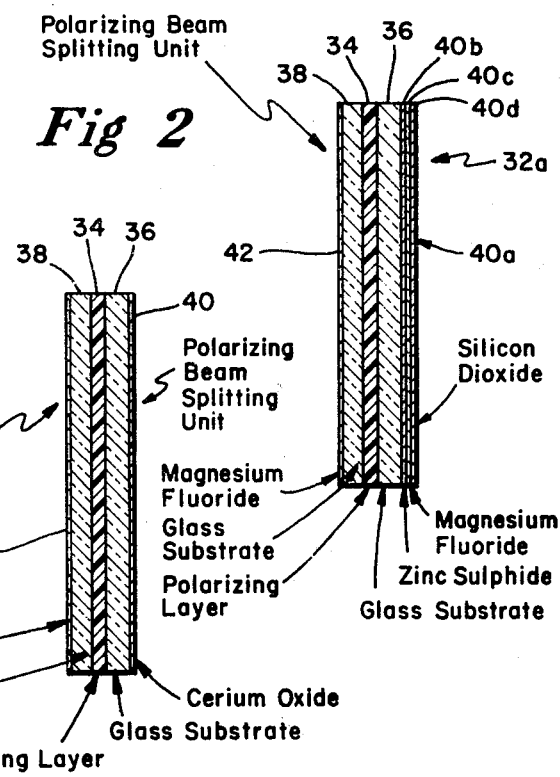
Fig 2
Fig 2A
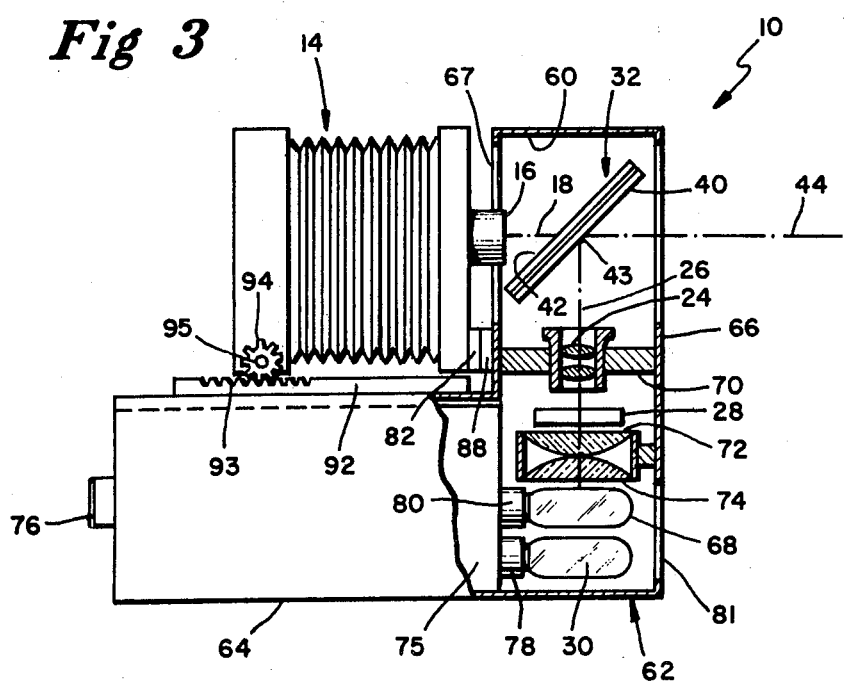
Fig 3

POLARIZING BEAM SPLITTING UNIT

BACKGROUND OF THE INVENTION

1. FIELD OF THE INVENTION

This invention relates generally to composite photography and pertains more particularly to a polarizing beam splitting unit employed therein to prevent degradation of the composite image.

2. DESCRIPTION OF THE PRIOR ART

The front projection technique of making composite photographs is well known. Equally well known are the problems attending such a technique. Since the background image is projected onto a screen, a high intensity reflection from the screen is desired. However, in order to properly illuminate a subject standing in front of the screen, fill light is utilized. If the source of fill light is well to one side, the amount of unwanted fill light impinging on the screen can be minimized. However, when this approach is taken, the advantage of the fill light is substantially reduced, attributable largely to the failure to eliminate the shadows that the subject casts. Actually, the placing of the fill light source or sources too far to one side is apt to produce even more pronounced shadows.

Generally, the presence of flare light acts to wash out the contrast of the composite image, much like attempting to project a color slide in a lighted room. The prior art has recognized that there are two major sources of flare light. The first one is from the projector that is utilized to provide the background image. More specifically, some of the light from the projector (that which is not reflected onto the screen) passes through the beam splitter and various efforts have been made to trap this unwanted illumination so that it does not reach the camera and thereby adversely affect the composite photograph. A second major source of flare light arises because the conventional lighting used to illuminate the subject must of necessity be relatively high as far as its intensity is concerned and if this light falls on the projection screen, the projected image is washed out in proportion to the amount striking the screen.

Consequently, the fill lighting units used to illuminate the subject have heretofore been placed well off to one side. The offsetting of the subject lighting units, however, prevents the use of the normal amount of fill light that is conventionally required to prevent the casting of harsh shadows which appear in the composite photograph. Also, attempts have been made to employ screening means to block the unwanted fill light from reaching the projecting screen directly. This has not proved to be effective, and becomes quite costly.

SUMMARY OF THE INVENTION

A general object of my invention is to provide a polarizing beam splitting unit that will assist in the producting of a composite photograph having an overall and consistently higher quality than heretofore.

A more specific object is to provide a polarizing beam splitting unit that not only attenuates the undesired portions of the light providing the projected image to thus reduce the flare light reflections but which has the additional advantage in that the unit can be manufactured with a suitable degree of optical flatness not heretofore possible with plastic substrates, the present invention enabling the use of glass substrates. Consequently, an aim of the invention is to produce and maintain a very sharp image, thus further enhancing the overall appearance of the resulting composite photograph.

Briefly, my invention contemplates the provision of a beam splitter so that an image received from a projector is reflected along a path normal to the screen, then reflected back along the same path, and finally through the beam splitter into the camera. A unique feature of the invention is that the beam splitter constitutes a unit that not only provides the beam splitting function but also performs a polarizing role as well. In this regard, a layer of polarizing material is sandwiched between two glass substrates possessing optically polished flat surfaces that are truly parallel to each other. Although the two substrates are cemented to the intermediately disposed polarizing material, this is done after one substrate has been coated with layers of zinc sulphide, magnesium fluoride and silicon dioxide to impart a reflection-enhancing quality to the unit, and also after the other substrate has been coated with a layer of magnesium fluoride to provide an anti-reflection surface capability. In another embodiment only a single layer of cerium oxide is employed as the reflection-enhancing coating.

BRIEF DESCRIPTION OF THE DRAWINGS

FIG. 1 is a diagrammatic representation of apparatus exemplifying the making of a composite photograph utilizing a composite polarizing beam splitting unit structured in accordance with the teachings of my invention;

FIG. 2 is a sectional view taken in the direction of line 2—2 of FIG. 1 for the purpose of showing one embodiment of my polarizing beam splitting unit;

FIG. 2A is a view corresponding to FIG. 2 but showing a second embodiment of the invention, and FIG. 3 is a side elevational view of a combined camera and projector making use of the polarizing beam splitting unit of FIG. 2.

DESCRIPTION OF THE PREFERRED EMBODIMENTS

To fully appreciate the benefits to be derived from my invention, it is believed best to refer first to FIG. 1 in which a system 10 for making composite photographs has been diagrammatically presented in its entirety. The system 10 makes it possible to photograph a subject against a background provided by a projected image from an appropriate transparency, thereby giving the appearance in the composite photograph that the subject was photographed in the actual environment represented on the transparency. The apparatus and method embodied in the system is more fully described and claimed in my copending application titled "COMPOSITE PHOTOGRAPHY AND METHOD UTILIZING A POLARIZING BEAM SPLITTING UNIT," Ser. No. 605,596, filed Aug. 18, 1975.

The system represented by what is schematically portrayed in FIG. 1 is made possible by the availability of autocollimating screen material, such as that marketed by Minnesota Mining and Manufacturing Company of St. Paul, MN which has the remarkable property of reflecting light over identically its incident path back toward the light source with almost no scatter or dispersion. A screen utilizing the autocollimating material just alluded to has been labeled 12 in FIG. 1 and will hereinafter for the sake of succinctness be referred to as a projection screen.

Although basically of conventional construction, a camera 14 is also included in the system 10. Thus, the camera 14 includes a lens 16 having an optical axis 18 that is generally perpendicular or normal to the plane of the projection screen 12. Also included in the camera 14 is a film holder 20. As already explained, though, the camera 14 is of conventional construction, although the exterior thereof is modified in the manner illustrated in FIG. 1 which will be referred to later on.

At this time, attention is direction to an image projector 22, also of conventional construction, having a lens 24 oriented along an optical axis 26. The optical axis 26 is generally parallel to the plane of the projection screen 12. Within the projector 22 is a slide transparency holder 28 and a lamp 30 which supplies the illumination for a transparency held in the holder 28 and which is projected onto the screen 12 in a manner presently to be described.

Playing a very important role in the effectiveness of the system 10 is a polarizing beam splitting unit denoted generally by the reference numeral 32. From FIG. 2, it can be discerned that there is a central layer 34 of polarizing material. The polarizing layer 34 is sandwiched between two transparent substrates 36, 38, the substrate in each instance being made of glass and having optically polished flat surfaces that are parallel to each other.

A reflection-enhancing coating 40 is applied to the other surface of the substrate 36 constituting a thin layer 40 of cerium oxide deposited on the substrate 36, coating 40 having a quarter wavelength thickness. Although it will become clearer later on, the polarization plane of the layer 34 is oriented in a direction which enhances the reflectivity of the coating 40. The coating 40, it can be explained, can readily be deposited onto the glass substrate 36, the deposition being done in a vacuum chamber; vacuum chambers have already been successfully employed for this purpose. The other substrate 38 is coated with an anti-reflection layer 42, also having a quarter wavelength thickness, of magnesium fluoride. It perhaps should be explained that the two glass substrates 36, 38 are first coated with the reflection-enhancing coating 40 in one instance and the anti-reflection coating 42 in the other. They are then cemented together with the sheet or layer 34 of polarizing material therebetween so that all of the components constituting the unit 32 are bonded together by means of optical cement.

Cerium oxide, which constitutes the coating 40 in the polarized beam splitting unit 32 of FIG. 2, is more difficult to work with than zinc sulphide. Zinc sulphide, on the other hand, is not as resistant to scratching, thereby making it more difficult to handle. In view of these differences, a modification of the polarized beam splitting unit 32 of FIG. 2 has been presented in FIG. 2A, being denoted generally by the reference numeral 32a. The unit 32a has a reflection-enhancing coating 40a composed of a thin layer 40b of zinc sulphide deposited on the glass substrate 36 which is the same as in the unit 32, an additional layer 40c of magnesium fluoride serving as a spacing layer between the zinc sulphide layer 40b and a third or outer layer 40d of silicon dioxide. Each of the layers 40b, 40c and 40d is of a quarter wavelength thickness. It will be appreciated that in this instance there are actually two rugged protective layers (the layers 40c and 40d); however, the hard insoluble layer 40d, being the outer layer, affords the primary assurance that a high coating reflectivity will be preserved.

It is important to appreciate that the composite polarizing beam splitting units 32 and 32a when constructed as just explained are optically equivalent to a single element of approximately one index of refraction throughout; hence, the units 32, 32a do not have any significant internal reflections which adversely affect the quality of the composite photograph. At this time it will simply be mentioned that the plane of polarization of the layer 34 in the units 32, 32a is quite important and is related to the plane of polarization of another polarizing screen or filter yet to be described.

Although beam splitters are quite well known, it should be stressed that a conventional beam splitter used in a front projection system is of the dichroic type produced by the same vacuum deposition that has been alluded to in the making of the units 32, 32a. In the making of a conventional beam splitter, high and low index materials are deposited upon the substrate, usually glass. However, it has been necessary to use multiple coatings in order to construct a beam splitter in which the reflectivity and transmission are in a desirable ratio, commonly approximately 50% transmitting and 50% reflecting. A shortcoming of such a coating arrangement, when employed at angles such as 45°, is that there is exhibited a difference in reflectivity as far as polarized light is concerned. The present invention, it is to be appreciated, makes use of polarized light and thus the units 32, 32a, when constructed as described, are quite important to a practical utilization of my invention. Also, a disadvantage of multiple coatings, as employed in the past, is to produce a beam splitter that is more selective in terms of color, the more coatings that are used causing a proportional greater increase in the selectivity. The more neutral a beam splitter is, the better it becomes as far as the making of color pictures is concerned.

Consequently, it is important to understand that the polarizing beam splitting unit 32 or 32a reduces the number of air-immersed surfaces in the complete system and thus minimizes the unwanted reflections at the boundaries between air and a material having a higher index of refraction. Still further, a beam splitter having fewer layers makes the beam splitter easier to manufacture, lowers its cost and also contributes to the ease in which the desired neutral color can be controlled or obtained. Thus, the units 32, 32a are substantially of the same index of refraction and therefore do not produce the undesirable surface reflections at either the front or back surfaces of the polaroid material. The coating 40 or 40a, as the case may be, on the front surface of the substrate 36, this being the reflective-enhancing coating, and the corresponding coating 42 on the second surface of the other glass substrate 38, this being the antireflection coating, produces an assembly functioning as a single reflecting surface, thereby avoiding the formation of double images. There is another distinct advantage to be derived from employing the polarizing beam splitting units 32, 32a which is better reserved for discussion when referring to the use of so-called fill light. Therefore, it is believed that a full understanding and appreciation of the benefits to be gained from using either the unit 32 or 32a will become even more apparent as the description progresses.

Both the optical axis 18 and the optical axis 26 have been mentioned. It is obvious from FIG. 1 that the optical axis 26 is generally perpendicular to the axis 18, the two intersecting at a locus 43 provided by the reflection-enhancing coating 40 of the polarizing beam splitting unit 32. Since the unit 32 is oriented at 45°, the two intersecting optical axes 18, 26 are then combined into a single or common axis 44 which is normal or perpendicular to the plane of the projection screen 12. Consequently, the light traversing the optical path 26 is directed by the polarizing beam splitting unit 32 in a direction normal or perpendicular to the plane of the screen 12, the common axis or path having been given the reference numeral 44, as mentioned above. The boundaries of the projected image supplied by the projector 22 and the field of view of the camera 14 are preferably of the same angular extent, the limits of this field having been denoted by the reference numerals 46a and 46b for the sake of completeness.

Since the goal of composite photography is to provide a photograph containing a foreground subject depicted against a background scene provided by a projected image, whatever subject that is to appear in the composite photograph must, quite obviously, be located between the projection screen 12 and the polarizing beam splitting unit 32. In many instances the subject is a human being, but for the sake of simplicity a sphere 48 has been selected as the subject in this instance.

In order to provide conventional illumination for the subject 48, various lighting units such as floor stand lamps may be used. For instance, a main or key light source 52 can be placed at a suitable distance from the subject 48 and an opaque screen or shield 54 positioned so as to block any direct illumination from the key light source 52 from falling on the projection screen 12. Quite obviously, the key light source 52 must be at a considerable distance to one side of the subject 48 or else the opaque screen 54 will not project the projection screen 12 from receiving light rays directly from the key light source 52. Owing to the considerable angle that must be employed, it follows that the light from the key light source 52 impinges on the subject 48 at an appreciable angle with respect to the common axis 44. It is this key light source 52 that produces, in many instances, rather severe shadows, the severity of course depending upon the type of subject 48. As far as live subjects are concerned, the shadow problem becomes quite pronounced, a person's nose, for instance, aggravating the situation.

To overcome the shadow problem, a fill light source 56 is employed having a polarizing filter or screen 58 via which the light from the source 56 must pass in order to provide a soft general illumination of the subject 48 and thus reduce the shadow effect produced from the main or key light source 52. From FIG. 1 it will be discerned that the source 56 is arranged so that it impinges on the subject 48 at an acute angle of approximately 30° with respect to the axis 44. Owing to this acute angle, an appreciable amount of light not intercepted by the subject 48 strikes the projection screen 12, but does not reach the camera 14 as will become apparent below. It will be understood that controlled shadows are acceptable and indeed are quite desirable in many instances in order to portray more realistically the subject. It is the ability to control adequately the length and opacity of the shadows that is important in composite photography and which control is adequately supplied by means of the system 10, especially as benefited from the use of the polarizing beam splitting unit 32 or 32a.

Having now mentioned the polarizing filter or screen 58 which is in front of the fill light source 56, it can now be appreciated that the two filters 34 (the polarizing layer in the units 32 or 32a and 58 (which has just been mentioned) have their polarization planes at right angles to each other. In this way, whatever light supplied by the fill light source 56, although striking to some degree the projection screen 12 is not dispersed or scattered by the screen 12 owing to its autocollimating properties. Thus, the reflected light from the screen 12 is in the same plane as the incident light impinging thereon. By orienting the polarization plane of the layer 34 in the polarizing beam splitting unit 32 or 32a at right angles or perpendicular to the polarization plane of the filter or screen 58, then any light reflected from the screen 12 that originates from the source 56 will be blocked by the filter layer 34 and will not pass to the camera 14 and thus will have no effect on the film contained in the holder 20.

Whereas the projection screen 12 is completely specular and does not depolarize any of the reflected light originating from the fill light source 56, so that it cannot pass to the camera 14 as explained above, the situation is much like that where there is no fill light at all. The purpose of utilizing fill light, as already pointed out, is to illuminate to better advantage the subject 48, doing so as far as the camera 14 is concerned because the subject depolarizes the illumination from the fill light source 56, the subject 48 not being specular as is the projection screen 12. Consequently, the fill light reflected from the subject 48, or at least that portion in the polarization plane of the layer 34, is transmitted back through the entire unit 32, then entering the lens 16 of the camera 14 so as to impinge on the film held by the holder 20.

Recapitulating for a moment, the projection screen 12 receives the background image supplied by the projector 22 and displays whatever scene is on the transparency held in the slide holder 28. There is no so-called washing out of the projected image because the key light source 52 is shielded by the opaque screen 54, light therefrom not being directed onto the projection screen 12. On the other hand, the projection screen 12 does receive light from the fill light source 56 but any reflected light is obstructed by reason of the difference in polarizing planes between that of the filter material 34 and that of the filter 58. Even though the illumination falling on the subject 48 has been polarized by reason of the screen 58, the reflected light from the subject 48 is not polarized, or at least enough light is dispersed into the plane or polarization provided by the layer 34 so that the camera 14 receives such light and records the subject as the photographer determines that it should be.

Although the benefits of using a beam splitter constructed in the manner in which the polarizing beam splitting unit 32, 32a are fabricated have been mentioned, it may not be completely obvious as to the extensiveness of the benefits to be derived from using these filter units 32, 32a. Polaroid material, such as that constituting the intermediate layer 34 in the units 32, 32a, has a certain parasitic loss, the material acting as a neutral density filter. A perfect or ideal polarizer would reduce the light energy to 50% of its original value. However, polaroid material actually transmits only about 35 to 38% of the incident light energy. The present invention makes use of this property, which has heretofore been regarded as undesirable, to gain an important advantage. Basically, this important advantage resides in the fact that the light from the projector 22 that is not reflected by the reflection-enhancing coating 40 or 40a passes through the entire unit 32 or 32a, being attenuated by the neutral density action of the polaroid material 34 as it first passes through.

Recognizing that some light does indeed pass through the unit, the system 10 of FIG. 1 makes use of a light absorbing plate 60 which has been shown as an independent element in FIG. 1 but which is actually a portion of a housing yet to be described. Even though the light absorbing plate 60 is black, there is still some reflection (because it is not totally absorbent) and what light is reflected from the plate 60 strikes on its return path the anti-reflection coating 42. Consequently, the light that is reflected from the absorbing plate 60 must then pass through the polaroid material or layer 34 a second time to reach the reflection-enhancing coating or surface 40 (or 40a), thereby further reducing or attenuating the unwanted light energy that has originated from the projector 22.

Still further, that portion of the light energy that has passed through the layer 34 in a reverse direction is reflected by the coating 42, that is reflected by the side thereof confronting the glass substrate 36, and then passes for a third time through the polaroid material or layer 34 with still additional reduction in the light intensity before being directed to the camera lens 16. Thus, whereas prior art devices have had to make use of complicated light traps in order to reduce the energy that has just been mentioned, the system 10 when using my unit 32 or 32a requires only a simple black surface, such as the light absorbing plate 60. By disposing the polarization plane, as hereinbefore mentioned, in a direction so as to enhance the reflectivity of the coating 40 (or 40a), the amount of light energy transmitted through the laminations 40 (or 40a), 36, 34, 38 and 42 to the plate 60 is reduced to begin with, thereby further contributing to the efficiency and effectiveness of the unit 32 (or 32a). Of course, the polarization plane of the layer 34 is maintained in use at right angles to the polarization plane of the screen 58.

In order to demonstrate just how simple and compact a practical version of the apparatus utilized in the system 10 can be, FIG. 3 has been presented. It will be observed that an L-shaped enclosure or housing 62 is employed, the housing 62 having a horizontal leg 64 provided with a rectangular cross section and a vertical leg 66 also formed with a rectangular cross section, the back side of the vertical leg 66 being open at 67 for accommodating the camera lens 16. The light absorbing plate 60 in the practical structure in FIG. 3 is merely the roof or top of the vertical leg 66, being integral with the upper edges of the side walls between which the unit 32 is supported. Since it performs the same function in FIG. 3 as in FIG. 1, the same reference numeral is employed in both instances. It might be pointed out at this stage that, wherever possible, identical reference numerals are used even though their physical appearance and location may differ somewhat from the highly diagrammatic system 10 portrayed in FIG. 1.

The lamp 30 in the projector 22 has already been mentioned. This lamp also appears in FIG. 3. Actually, nearly all portrait photography nowadays utilizes electronic flash techniques for lighting the subject. Therefore, the lamp 30 constitutes a flash tube for making the actual exposure. In order to provide light for focusing and composing the background, however, an incandescent lamp 68 is arranged just above the flash tube 30. It will be appreciated that since the envelope of the incandescent lamp 68 is clear or transparent, the light from the flash tube or lamp 30 can pass freely upwardly through the incandescent lamp 68 used for focusing.

A fixed plate 70 within the vertical leg 66 of the enclosure 62 supports the lens 24 for the projector 22. The mount for the projection lens 24 is preferably mounted on or in the plate 70 by screw threads so that rotation of the lens 24 will permit the raising or lowering of it in order to focus the slides contained in the slide transparency holder 28. From FIG. 3 it will be seen that the slide holder 28 is disposed beneath the lens 24 but above a pair of condensing lenses 72, 74. Lens arrangements, such as that only generally described, are quite common and any detailed description is believed to be unnecessary.

The power supply for the lamps 30, 68, together with the electronic synchronizing and trigger circuitry therefore, can all be housed within a modular unit 75. This module 75 is adapted to slide into the horizontal leg 64 of the enclosure 62, a handle 76 enabling this to be done. Sockets 78 and 80 are provided for the accommodation of the lamps 30, 68. In this way, all of the wiring can be bench-assembled. Access through an opening 81 in the front of the horizontal leg 64 can permit the changing of either the lamp 30 or 68 without removing the module 75, even though the removal of the module 75 is a simple and straightforward task.

The camera 14 is provided with a plate 82 having two spaced dowel pins (now shown). The plate 82 can be secured to the casing of the camera 14 in any suitable manner. The L-shaped enclosure 62 is likewise provided with a plate 88 having two holes (not shown) that are registrable with the pins that have just been alluded to. The plate 88. as with the plate 82, can be secured to the vertical leg 66 in any suitable manner. In initially aligning the equipment, one or both of the plates 82, 88 can be shifted laterally before securing it in place, doing so until the camera lens 16 is properly positioned within the open side 67 along its axis 18, and also with respect to the axis 26 of the projector 22 so that both of these axes 18, 26 thus intersect at the proper point 43 on the reflective coating 40 of the unit 32.

It should be noted that the lens 16 for the camera 14 is fixedly located, once adjusted, because of the plates 82 and 84. However, the rear, that is its film holder 20, of the camera 14 is supported on a base plate 92 so that it can be moved closer or farther from the lens 16 in order to focus the composite image on the film held in the holder 20. While various expedients can be used for moving the rear of the camera, a simple rack 93 at each side and a pair of pinions 94 are used in the illustrated instance, the racks 93 being integral with the base plate 92. The pinions 94 are mounted at opposite ends of a shaft and can be rotated by a knob (not shown), on either end of the shaft 95, the knob enabling proper positioning of the film holder 20 in relation to the lens 16.

I claim:

1. A polarizing beam splitting unit comprising a first transparent substrate having a reflection-enhancing coating on one surface thereof, a second transparent substrate having a reflection-reducing coating on one surface thereof, and a sheet of polarizing material between said substrates and secured to the other surfaces thereof.

2. A beam splitting unit in accordance with claim 1 in which said reflection-enhancing coating includes a material selected from the group consisting of cerium oxide and zinc sulphide.

3. A beam splitting unit in accordance with claim 2 in which said anti-reflection coating is magnesium fluoride.

4. A beam splitting unit in accordance with claim 3 in whch said substrates are glass, said one and said other surface of each substrate being optically flat and parallel.

5. A beam splitting unit in accordance with claim 4 in which said substrates are cemented to said sheet of polarizing material.

6. A beam splitting unit in accordance with claim 1 in which said reflection-enhancing coating comprises a layer of zinc sulphide deposited on said second substrate, a layer of magnesium fluoride on said zinc sulphide layer and an outer layer of silicon dioxide on said magnesium fluoride layer.

7. A beam splitting unit in accordance with claim 6 in which said anti-reflection coating constitutes a layer of magnesium fluoride.

* * * * *